United States Patent [19]

Merrill et al.

[11] Patent Number: 5,113,502

[45] Date of Patent: May 12, 1992

[54] METHOD AND APPARATUS FOR SAVING AND PERFORMING INDUSTRIAL CONTROL COMMANDS

[75] Inventors: Richard A. Merrill, Ann Arbor; Bruce L. Crockett, Pinckney; Robert C. Strader, Saline, all of Mich.

[73] Assignee: Allen-Bradley Company, Inc., Milwaukee, Wis.

[21] Appl. No.: 531,277

[22] Filed: May 31, 1990

Related U.S. Application Data

[62] Division of Ser. No. 932,987, Nov. 20, 1986, Pat. No. 4,942,552.

[51] Int. Cl.[5] ............... G06F 3/00; G06F 15/16
[52] U.S. Cl. ................... 395/375; 364/921; 364/940.8; 364/942.3; 364/942.5; 364/DIG. 2
[58] Field of Search ... 364/900 MS File, 200 MS File

[56] References Cited

U.S. PATENT DOCUMENTS

| | | | |
|---|---|---|---|
| 4,298,959 | 11/1981 | Sundermeyer et al. | 364/900 |
| 4,315,310 | 2/1982 | Bayliss et al. | 364/200 |
| 4,319,338 | 3/1982 | Grudowski et al. | 364/900 |
| 4,325,120 | 4/1982 | Colley et al. | 364/200 |
| 4,363,093 | 12/1982 | Davis et al. | 364/200 |
| 4,407,016 | 9/1983 | Bayliss et al. | 364/200 |
| 4,451,898 | 5/1984 | Palermo et al. | 364/900 |
| 4,498,133 | 2/1985 | Bolton et al. | 364/200 |
| 4,694,396 | 9/1987 | Weisshaar et al. | 364/200 |
| 4,803,613 | 2/1989 | Kametani et al. | 364/200 |
| 4,831,582 | 11/1986 | Miller et al. | 364/900 |

*Primary Examiner*—Thomas C. Lee
*Assistant Examiner*—Larry Donaghue
*Attorney, Agent, or Firm*—Quarles & Brady

[57] ABSTRACT

A communications system for industrial controllers includes interface controllers which implement a remote command capability. The remote command feature allows conventional communications commands to be saved at a responding interface controller in a remote command table and performed at a later time. A "SAVE" type remote command includes an ID field and an embedded command. The embedded command is stored in the remote command table at a location corresponding to the ID field. The ID field is used to access the embedded command in subsequent remote commands. A "PERFORM" type remote command contains a string of ID's, which indicates which saved commands are to be performed and the order in which to perform them. When a PERFORM command is received, the conventional command stored in the remote command table is recalled and transmitted onto a communications network. The PERFORM command can be addressed to a single interface controller, or it can be broadcast to all interface controllers in the communications system. Remote commands are also provided to examine and delete remote command table entries at a responding interface controller.

5 Claims, 15 Drawing Sheets

FIG. 2  EXAMPLE NETWORK MESSAGE TRAFFIC: SINGLE RESPONDER STATION

EXAMPLE NETWORK MESSAGE TRAFFIC:
MULTIPLE RESPONDER STATIONS

METHOD AND APPARATUS FOR SAVING AND PERFORMING INDUSTRIAL CONTROL COMMANDS

CROSS REFERENCE

This application is a division of application Ser. No. 06/932,987, filed Nov. 20, 1986, now U.S. Pat. No. 4,942,552.

BACKGROUND OF THE INVENTION

The field of the invention is industrial control communications systems, and particularly, to interface controllers which implement communications commands used in such systems.

A large manufacturing process may involve several industrial controllers such as, for example, programmable controllers, numerical controllers, and process controllers which must coordinate their operation. A master controller is often used to direct the operation of the other subordinate controllers and to collect status information for reporting purposes. The communications among the industrial controllers is usually accomplished using an interface controller which implements a set of communications commands, as is well known in the art. The communications commands are issued from the industrial controller to the attached interface controller. The interface controller sends the command to a destination interface controller over a communications network, which may be of any suitable type or topology. The destination interface controller is attached to another industrial controller and executes the communications command.

The communications commands are most commonly read or write operations for transferring data from the user memory of one industrial controller to another. Mode control commands for changing the operating mode of another controller are also common. Standard sets of communications commands have been developed such as, for example, the Manufacturing Automation Protoçol (MAP) standard.

In prior systems, the communications commands are executed immediately upon receipt and so the entire command must be sent each time it is to be executed and at the precise moment that it is to be executed. The communications commands can be quite long and so to repeat the same message a number of times wastes the communications network resources. Also, because the commands must be sent at certain times, peak levels of message traffic can occur when several commands need to be sent at the same time. This can occur, for example, during periodic status reporting. The peak traffic levels can degrade communications network performance.

A further limitation in prior systems is that the commands are carried out as two party transactions. Therefore, it is not possible for one controller to command a data transaction between a second and third controller. Instead, the first controller must involve itself as a mediary by first issuing a command to transfer the data to itself and then another command to transfer the data to the third controller. This is a serious drawback as the third party situation occurs frequently, for example when the master controller wants to upload or download a second controller from a mass storage device connected to a third controller.

SUMMARY OF THE INVENTION

The present invention relates to an interface controller which implements a remote command capability for saving communications commands and performing them at a later time. The remote command set includes a SAVE command and a PERFORM command. Embedded within the SAVE command is a communications command which is formatted for transmitting to a target station. When the SAVE command is received at an interface controller, the embedded command is saved by storing it in a remote command table. Then, when a PERFORM command is received, the embedded command is recalled from the remote command table and transmitted to the target station. The target station may be any network station, including the network station which sent the PERFORM command. If the target station is the same as the network station which sent the PERFORM command, then the transaction is a two party transaction between the network station which sent the PERFORM command and the network station which received it. Otherwise, the target station can be a third network station and a third party transaction occurs.

One aspect of the present invention is to reduce message traffic by saving commands which are executed often so that only the shorter PERFORM command needs to be sent each time. In addition, the SAVE command includes an ID field which is associated with the embedded command. In this way, multiple commands can be saved with unique ID's. The PERFORM command includes a string of ID's which specifies a series of commands to be performed, thereby resulting in even greater reductions in message traffic.

Another aspect of the present invention is to relieve peak levels of message traffic by pre-storing commands at a time when network traffic is low. The saved commands remain in the remote command table indefinitely and can therefore be performed repeatedly without re-saving the commands. This further reduces message traffic for frequently used commands.

Yet another aspect of the invention is to provide a status reply message indicating the outcome of a PERFORM command. After each embedded command is sent out, the target station returns a reply message which contains a status code. The interface controller saves the returned status code for each ID in the ID string of the PERFORM command. After all of the replies have been received, the interface controller builds a reply message to the PERFORM command which includes all of the individual status codes and sends the reply message to the station which originated the PERFORM command.

It is an object of the invention to provide an inter-face controller in which certain selected commands can be saved in nonvolatile memory so that they are always avail-able. Fixed ID values are associated with a nonvolatile storage device. When a SAVE command is received specifying an ID with a value equal to one of the fixed ID values, then that embedded command is saved in nonvolatile storage. The commands so saved are always intact, even after a power outage of the interface controller.

Another object of the invention is to provide additional remote commands for manipulating the remote command table. An EXAMINE command is provided which specifies the ID of a saved command, and a copy of the saved command is returned in response. A DE- LETE command is provided which specifies that an indicated ID is to be deleted from the remote command table.

Still another object of the invention is to provide an ability to send a single third party command without saving it in the remote command table. An EXECUTE type remote command contains a single embedded command. The interface controller responds to the EXECUTE command by immediately sending out the embedded command without saving it.

Yet another object of the invention is to provide a communications system in which commands are saved at a plurality of stations and are performed by means of a single PERFORM command which is broadcast to all stations in the network. Any station which has a command saved for the ID's specified in the broadcast PERFORM command will accept the PERFORM command and carry it out.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

GENERAL DESCRIPTION OF THE INVENTION

Figure 1:
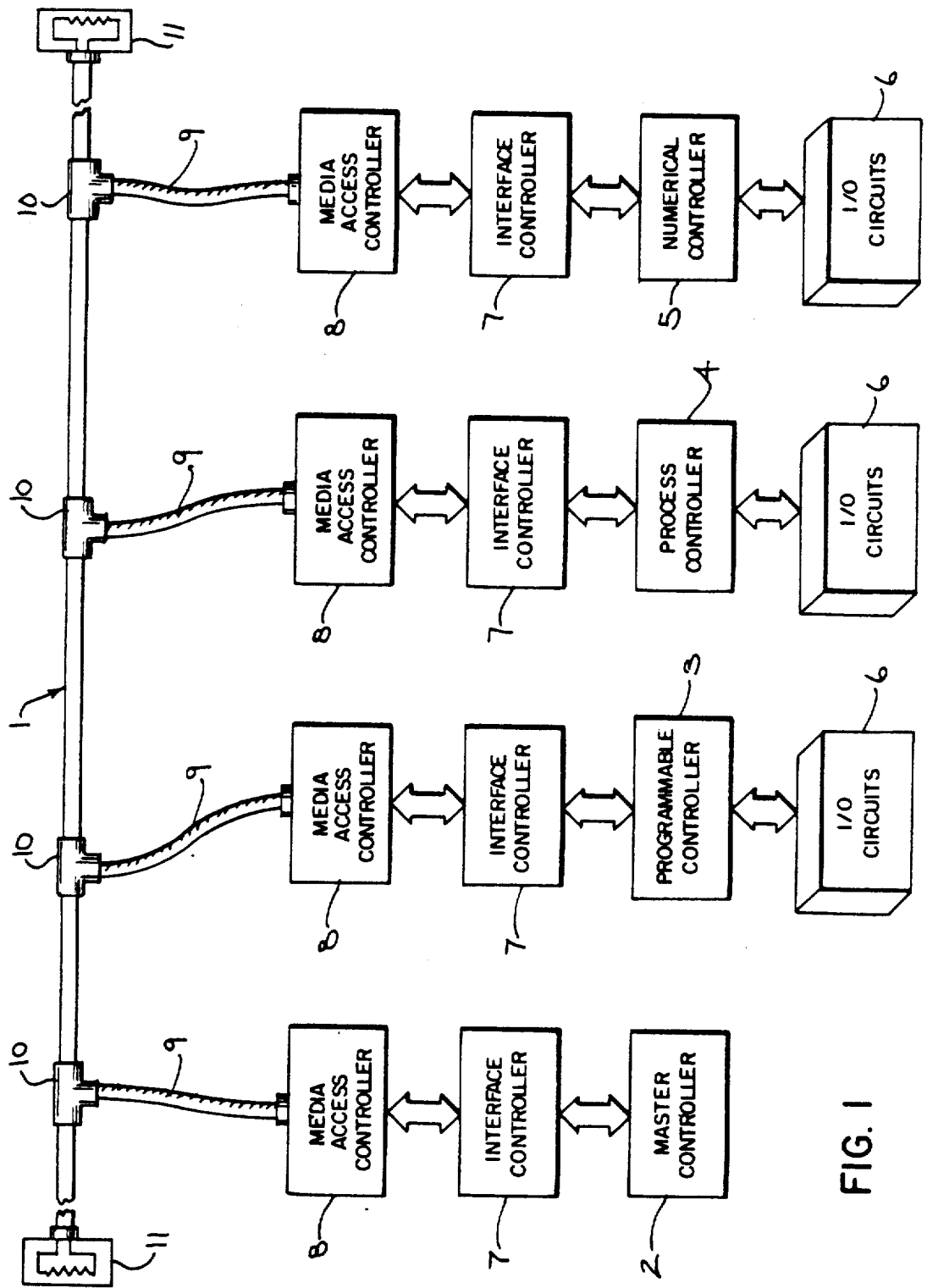
FIG. 1 is a pictorial view of a communications network which employs the present invention.

Referring to FIG. 1, a bus 1 is used to provide communications among a variety of industrial control systems 3, 4 and 5. Such connections are typical where the systems 3, 4, and 5 are required to coordinate their operation or to periodically provide status reports to a master controller 2. The programmable controller 3, the process controller 4, and the numerical controller 5 all connect to associated I/O circuitry 6 which is used to control the related process.

Each of the systems 2, 3, 4, and 5 serves as a host for an interface controller 7. Each interface controller 7 in turn interfaces to a Media Access Controller (MAC) 8 for accessing the bus 1 through drop cables 9 and tap 10. The bus 1 is terminated at each end with a passive termination 11.

The message traffic on the bus 1 consists of commands and responses between interface controllers 7. The interface controllers 7 thus converse among themselves using many different types of conventional commands, most commonly reading or writing data from one host system 1, 3, 4, and 5 to another.

Using the present invention, conventional commands can be saved at another interface controller 7 for later use. A set of "remote" commands are provided to accomplish this. The remote command set includes:

| Remote Command | Function |
| --- | --- |
| SAVE | Contains an identification number (ID) and an embedded conventional command. The conventional command is saved at the remote system under the specified ID. The ID is used to identify the saved command for all other remote commands. |
| EXAMINE | Contains the ID of a previously saved command. The remote station responds by sending back the text of the command saved under that ID. |
| DELETE | Contains the ID of a previously saved command to be deleted from the table of saved commands at the remote station. |
| PERFORM | Contains a string of one or more ID's which specify a series of saved commands to be performed. The specified commands are performed in the order in which their ID's appear in the string. |
| EXECUTE | Contains an embedded conventional command which is temporarily saved, immediately performed, and then deleted. The execute command has an effect similar to a sequence of SAVE, PERFORM, and DELETE commands. |

Figure 2:
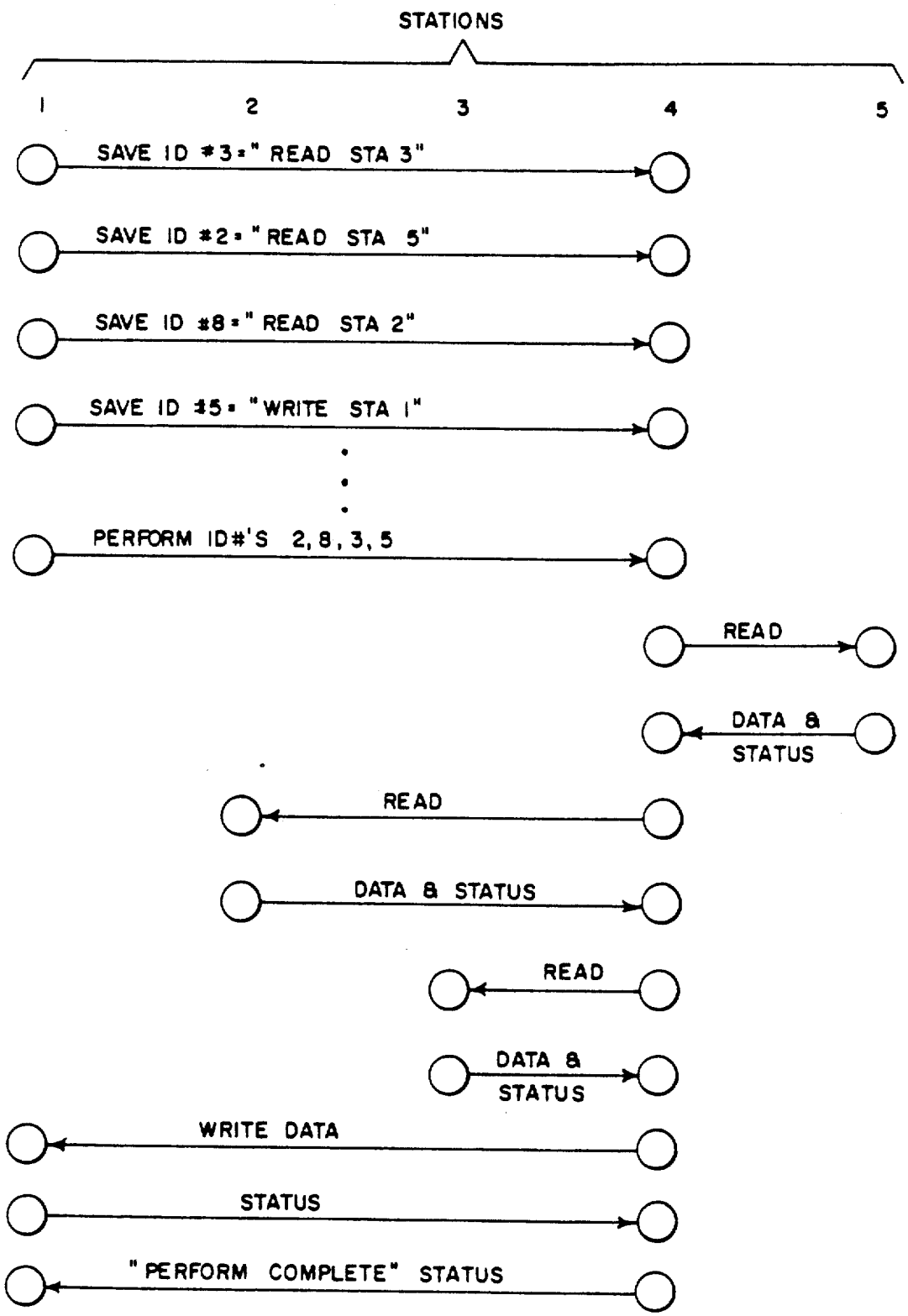
FIG. 2 is a diagram of example network message traffic using a single responder station in a network of the present invention.

Referring to FIG. 2, an exemplary five station network is used to illustrate the message traffic resulting from a typical application. In this example, station #1 is acting as the master controller and desires to periodically command station #4 to collect certain data from the other stations and then report back that data. The first message is a SAVE command from station #1 to station #4. That message indicates that a "read from station #3 command" is to be saved under the ID number 3. As will be explained in detail below, the command being saved is a complete command including any necessary parameters, and is embedded as a data field in the SAVE command. The commands in this example are understood to contain parameters for such things as memory addresses for read and write operations which are omitted for simplicity.

Also, a routine status reply message (not shown) is returned for each SAVE command.

The next messages are two more SAVE commands from station #1 to station #4. A "Read from Station #5" command is stored under ID #2 and a "Read from Station #2" command is stored as ID #8.

Then a "Write to Station #1" command is stored as ID #5. The target of the stored commands can be any station, including the originator of the SAVE command as in this case.

To this point, four commands have been saved at station #4. The commands stored at Station #4 are formatted to be sent out as if the commands came from Station #4. When the PERFORM command is later received at Station #4, the commands corresponding to the indicated ID's are sent out.

In this example, when it is desired to perform the commands previously saved, Station #1 sends to Station #4 a "PERFORM" command containing the string of ID numbers "2, 8, 3, 5". The string of ID numbers specifies which commands are to be performed by Station #4 and the order in which they will be performed. Only the commands specified in the PERFORM command are performed, which can include one, all, or any subset of the saved commands. The string of ID numbers can be in any order desired, regardless of the order in which the commands were saved.

Once the PERFORM command is received by Station #4, the command stored under ID #2 is performed, in this case a read command to Station #5. Station #4 sends out the read command to Station #5 and Station #5 responds by sending back the requested data in a reply message. The reply message also contains a status code indicating whether or not an error occurred in the transaction, and if so, what type of error. The status codes are stored from this and all subsequent commands performed and are used to build a reply message to the PERFORM command as described below. Similarly, the next command under ID #8 is a read command to station #2, and Station #2 responds with the requested data and a status code. The next ID in the string is ID #3 which causes a read command from station #4 to be sent to Station #3 and the data reply and status code to be sent back to Station #4.

The last command in this example perform sequence is ID #5, which is a write command back to Station #1. The write command is sent out by Station #4 to Station #1. A reply message indicating the status code for the write message is then returned from Station #1 to Station #4, completing this perform sequence. The last message is a status reply from Station #4 to Station #1 indicating the completion of the PERFORM command and including the individual status codes of all the commands performed.

Figure 3:
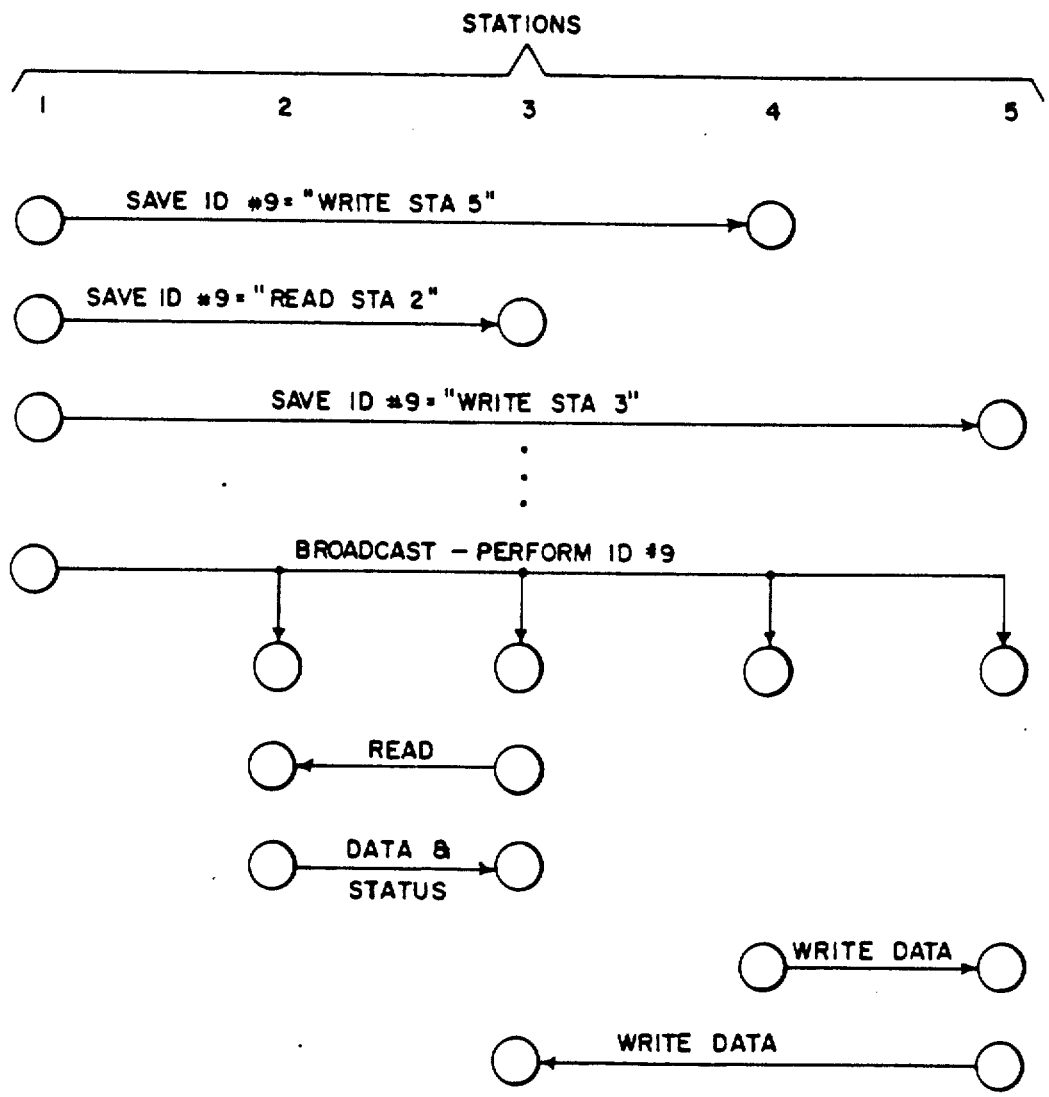
FIG. 3 is a diagram of example network message traffic for multiple responder stations on a network of the present invention.

In the foregoing example, a single responder station was used to store all of the saved commands. This invention also enables the PERFORM command to be broadcast to multiple stations to perform commands stored under like ID numbers. Referring to FIG. 3, a second example of the network message traffic that results when multiple responder stations are used is as follows. Again, Station #1 is acting as the master controller, but in this example the application is to command a series of data transactions among the host Stations 3, 4 and 5. First, a SAVE command from Station #1 directs Station #4 to save a "write to Station #5" command as ID #9. Then a SAVE command from Station #1 directs Station #3 to save a "read from Station #2" command as ID #9. Similarly, a "write to Station #3" command is saved under ID #9 at station 5.

Some time later after storing the above commands, Station #1 sends out a PERFORM command indicating ID #9 to be performed. In this example, the PERFORM command is broadcast to all stations on the network instead of being addressed to a single responder station. Each of the Stations #3, #4, and #5 have a command saved under ID #9 and have received the PERFORM command for ID #9. Each station therefore waits for access to the communication network and performs its command saved under ID #9.

In this example a token passing network is employed for network access control and the token is passed in ascending address order. Station #2, therefore, receives the token next, but does not have a command saved under ID #9 and so no action is taken. The token then passes to Station #3, where the read command saved under ID #9 is sent to Station #2. Station #2 responds by sending back the requested data and a status code. In the case of a broadcast PERFORM command, a reply message to the PERFORM command is not used, so the individual status code replies are discarded. Station #4 receives the token next and performs the instruction stored under ID #9 at that station, which is a write to Station #5. Station #5 then sends a routine reply message (not shown), the status code of which is discarded. Finally, Station #5 receives the token and performs the command saved under ID #9 at that station by writing data to Station #3. Again, the status code in the routine reply message (not shown) from Station #3 is discarded, The originating station does not receive an acknowledgement of the completion of the PERFORM command because broadcast messages are not directed to any one station, and therefore do not receive a response.

DESCRIPTION OF THE PREFERRED EMBODIMENT

Referring to FIG. 1, a large scale industrial process typically involves several systems communicating over a bus 1. Each system includes a Media Access Controller (MAC) 8, an interface controller 7, and some type of industrial controller 2, 3, 4 or 5. In this embodiment of the invention, the ability to save commands to be performed at a later time is implemented in the interface controllers 7. The interface controller 7 accepts commands from the associated controller 2, 3, 4 or 5 and delivers those commands via the MAC 8 to another interface controller 7 where the command is carried out.

The MAC 8 provides for network communications among the interface controllers 7 and can use any suitable network protocol, such as for example, a Carrier Sense Multiple Access (CSMA) scheme as defined by the Ethernet Standards, or a token passing logical ring network. The MAC 8 preferred for this embodiment is that which is described in detail in co-pending U.S. Patent application Ser. No. 771,834 filed on Sep. 3, 1985 entitled Industrialized Token Passing Network and assigned to the assignee of the present invention, the contents of which are herein incorporated by reference.

The MAC 8 so described implements a physical layer and link layer protocol as defined by the seven layer reference model for Open Systems Interconnection (OSI) published by the International Standards Organization (ISO). The type of network implemented by that preferred MAC 8 is a token passing logical ring network.

Figure 4:
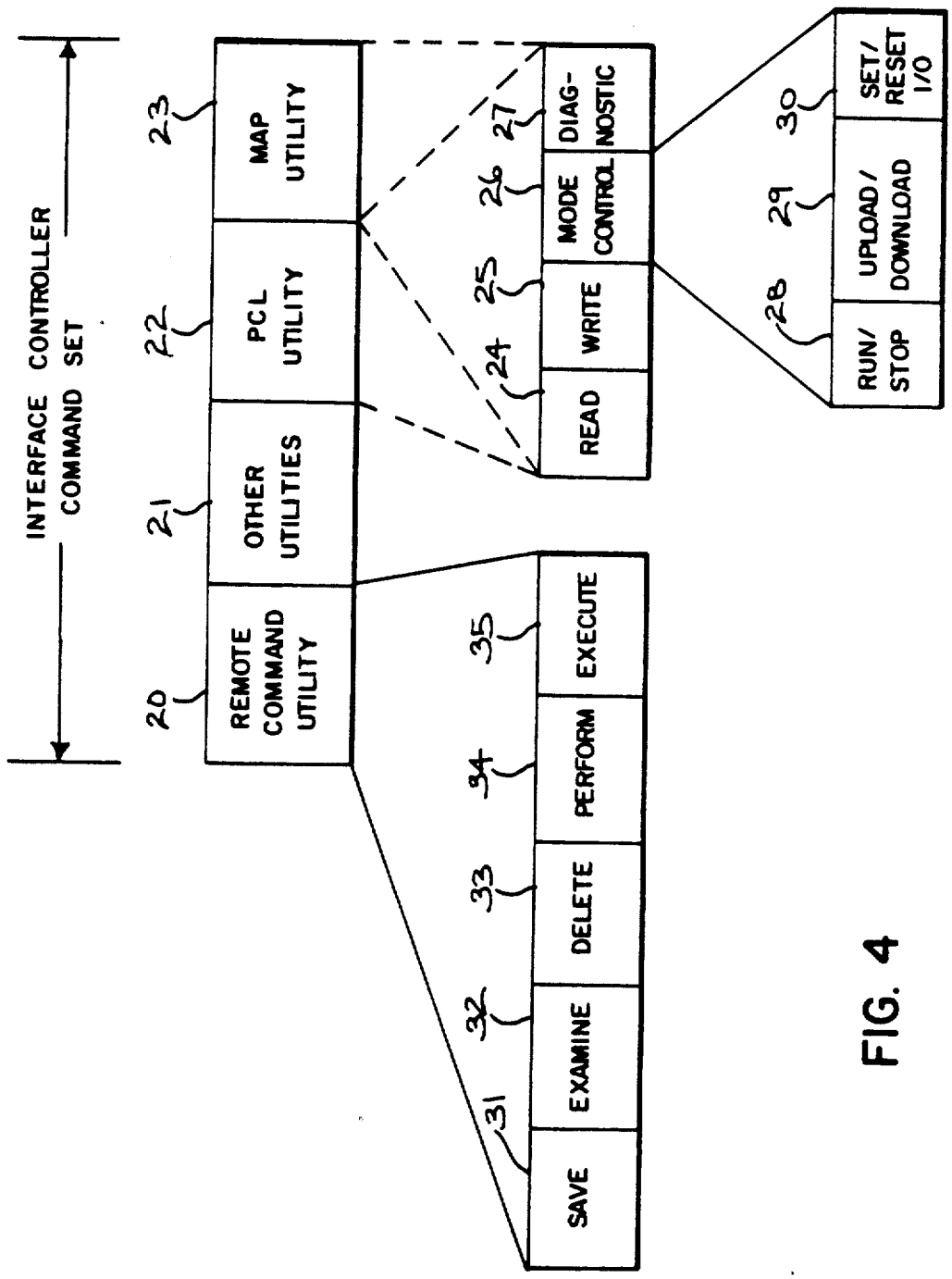
FIG. 4 is a schematic representation of the command set for an interface controller which forms a part of the communications network of FIG. 1.

Referring to FIG. 4, the interface controller 7 implements a command set which provides several communication utilities to the attached host controller 2, 3, 4 or 5. The host controller 2, 3, 4 or 5 may be any suitable processor for formulating commands conforming to the command set provided by the interface controller 7. The actual interface between the interface controller 7 and the host controller 2, 3, 4 or 5 may be any suitable type such as for example serial, parallel, or backplane. The interface in this embodiment is a serial interface which is used to exchange commands, data requests, and replies between the host 2, 3, 4 or 5 and the interface controller 7.

Still referring to FIG. 4, the interface controller command set includes utilities 20, 21, 22 and 23. The Peer Communications Language (PCL) Utility 22 represents instructions well known in the art for communications among industrial controllers including read commands 24, write commands 25, mode control commands 26, and diagnostic commands 27. The read commands 24 allow one controller to read data from the control memory (not shown) of another controller. Similarly, the write commands 25 allow data to be written into the control memory of another processor. Both the read commands 24 and the write commands 25 contain parameters which specify the data to be moved, including the source address, destination address, and the length of data to be moved. The mode control commands 26 are recognized and acted upon by the receiving host 2, 3, 4 or 5. The mode control commands 26 provide such control functions as commanding the receiving host 2, 3, 4 or 5 to change mode between run/stop 28, to upload or download programs or data 29, or to set/reset the I/0 ports 30. The diagnostic commands 27 allow access to internal diagnostic parameters of the receiving host 2, 3, 4 or 5.

The PCL utility 22 defines the instructions 24, 25, 26 and 27 in a particular format which is usually peculiar to a particular manufacturer and any suitable defined format may be used with this invention. A standardized set of commands used by several manufacturers is the Manufacturing Automation Protocol (MAP) utility 23. The MAP standard defines similar instructions for reading 24, writing 25, mode control 26 and diagnostics 27. Other utilities 21 which may include electronic mail or special communications commands are also useable with this invention.

The Peer Communications Language (PCL) utility 22, the Manufacturing Automation Protocol (MAP) utility 23 and the other utilities 25 as described above define instructions which are well known in the art for industrial process control and communications. These instructions are given to an originating interface controller 7 where they are sent over the network 1 to a receiving interface controller 7. Upon receipt, the instructions are responded to immediately. At times during an industrial process, a large number of instructions are sent out all at once, for example to periodically collect process performance data. This results in very high peak levels of message traffic which results in long message delays.

An interface controller 7 of the present invention includes a remote command utility 20 which allows instructions from the utilities 21, 22, and 23 to be saved at the receiving interface controller 7 via a SAVE command 31. The remote command utility 20 also includes instructions to EXAMINE 32, DELETE 33, and PERFORM 34 the saved instructions as defined in the General Description of the Invention above, and an EXECUTE command to facilitate transmitting a single third party command.

The saved instructions serve two functions. First, the instructions can be saved at times when the message traffic on the network is low. Then, a single PERFORM command can be used to invoke many saved commands and to thereby reduce peak levels of message traffic which would otherwise occur. Secondly, the saved instructions can be performed as third party instructions which greatly simplifies operations where one controller desires to command an interaction among two other controllers. For example, if controller "A" wants to upload controller "B" from a mass storage device connected to controller "C", a single upload command can be saved at "B" by "A". Then when "A" sends a PERFORM command, "B" sends out the upload command to "C" as a conventional upload command from "B". The controller "A" is thereby relieved of any further involvement in the transaction. Without the third party capability of this invention, it would be necessary for "A" to first upload the data from "C" into its own memory and then send that data to "B". Two party transactions are also possible if the target of the saved instruction is the same network station which sent the PERFORM command.

Figure 5:
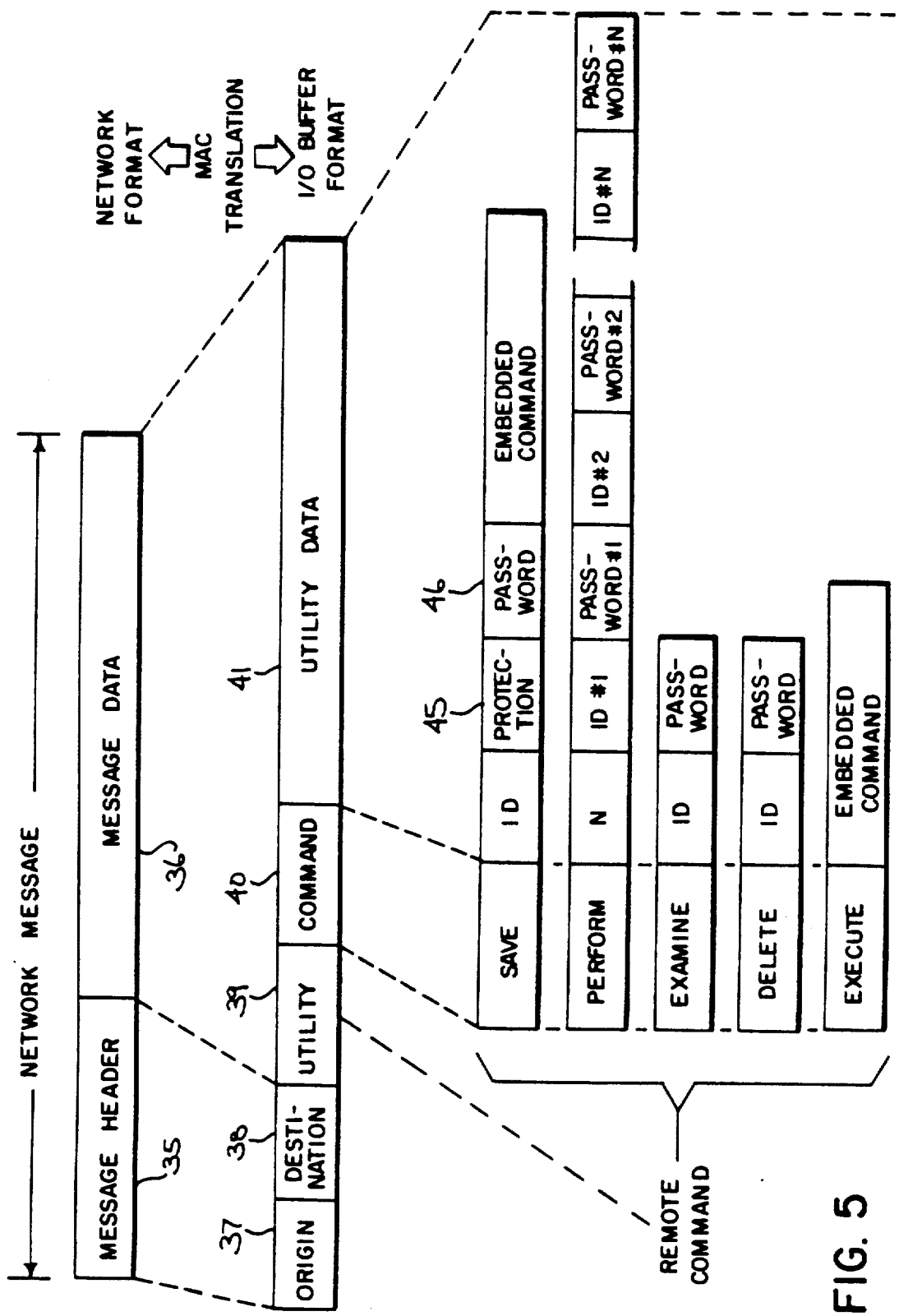
FIG. 5 is a schematic representation of the structure of the messages which are sent over the communications network of FIG. 1.

Referring to FIG. 5, a network message includes a message header 35 and message data 36. The network message is processed by the physical layer and link layer in the MAC 8. Network maintenance messages such as, for example, token passes and acknowledgements are processed automatically by the MAC 8 and are not forwarded to higher layers. If however, the message is a data message, then the message data 36 is placed in an I/O buffer along with an origin field 37 and a destination field 38 extracted from the message header 35 indicating the source and destination of the message.

Only messages addressed to the receiving station as indicated by the destination field 38 are placed in an I/O buffer for further processing. A message may be addressed to a station in two ways; either by being specifically addressed to the station or by being a broadcast message, which is implicitly addressed to all stations. If the message is specifically addressed to a station, then the destination field 38 contains the address of the station. If the message was sent out as a broadcast, then the destination field 38 contains a value of "255".

The I/O buffer is further decoded by higher protocol layers which are described below. The I/O Buffer format also includes a utility field 39, a command field 40, and utility data 41. The utility field 39 determines to which utility this command is to be routed, including whether the utility is a sender or a responder. A sending utility at one station sends the command to a mating responder utility at the receiving station which then carries out the command. Upon completion of the command, the responder utility sends a reply back to the sender utility. The command field 40 specifies a command code to a responder utility or a reply code to a sending utility. The utility data field 41 contains data which is used to carry out the command or to further specify the reply.

If the utility specified in the utility field 39 is for a remote command, then the command field 40 specified a command from the remote command set; SAVE, PERFORM, EXAMINE, DELETE, or EXECUTE. If a SAVE command is specified, then the Utility Data field 41 contains the following fields:

| | |
|---|---|
| A. I.D. | The ID field specifies a number from 1 to 255 which is used to identify the saved command in all subsequent transactions. |
| B. PROTECTION. | The protection field is 45 specifies the level of protection to be afforded to this saved command. There are three levels of protection which may be specified, which are:<br>Level 0 - Unrestricted, any station may access.<br>Level 1 - Only stations which present a correct password may access.<br>Level 2 - Only the station which saved the command may access. |
| C. PASSWORD. | The password 46 is used for level 1 protection as defined above. The specified password 46 is saved and must be matched by the password field in subsequent transactions if level 1 protection is specified. |
| D. EMBEDDED COMMAND. | The embedded command contains sub-fields described below which specify the command which is being saved. |

If the command 40 is a PERFORM command, then the utility data field 41 contains a number N and a series of ID/Password pairs, where N specifies the number of ID/Password pairs in the command. The maximum number of ID/Password pairs is limited to 122 because of a limit on the maximum message length on the network. Each ID specifies a command to be performed, in order, from ID #1 to ID #N. Associated with each ID is a password. If the protection field 45 saved for an ID to be performed specifies level 1 protection, then the password supplied in the ID/Password pair must match the password 46 saved for that ID number. Otherwise the command for that ID is not performed.

The EXAMINE command contains an ID and a password in the utility data field 41. This command causes the receiving station to send a reply message containing a copy of the embedded command saved under the specified ID. The password is used if the saved command has level 1 protection. Similarly, the DELETE command causes the command saved under the specified ID to be deleted.

The EXECUTE command contains an embedded command in the utility data field 41. The embedded command is performed immediately and then discarded as described in detail below.

Figure 6:
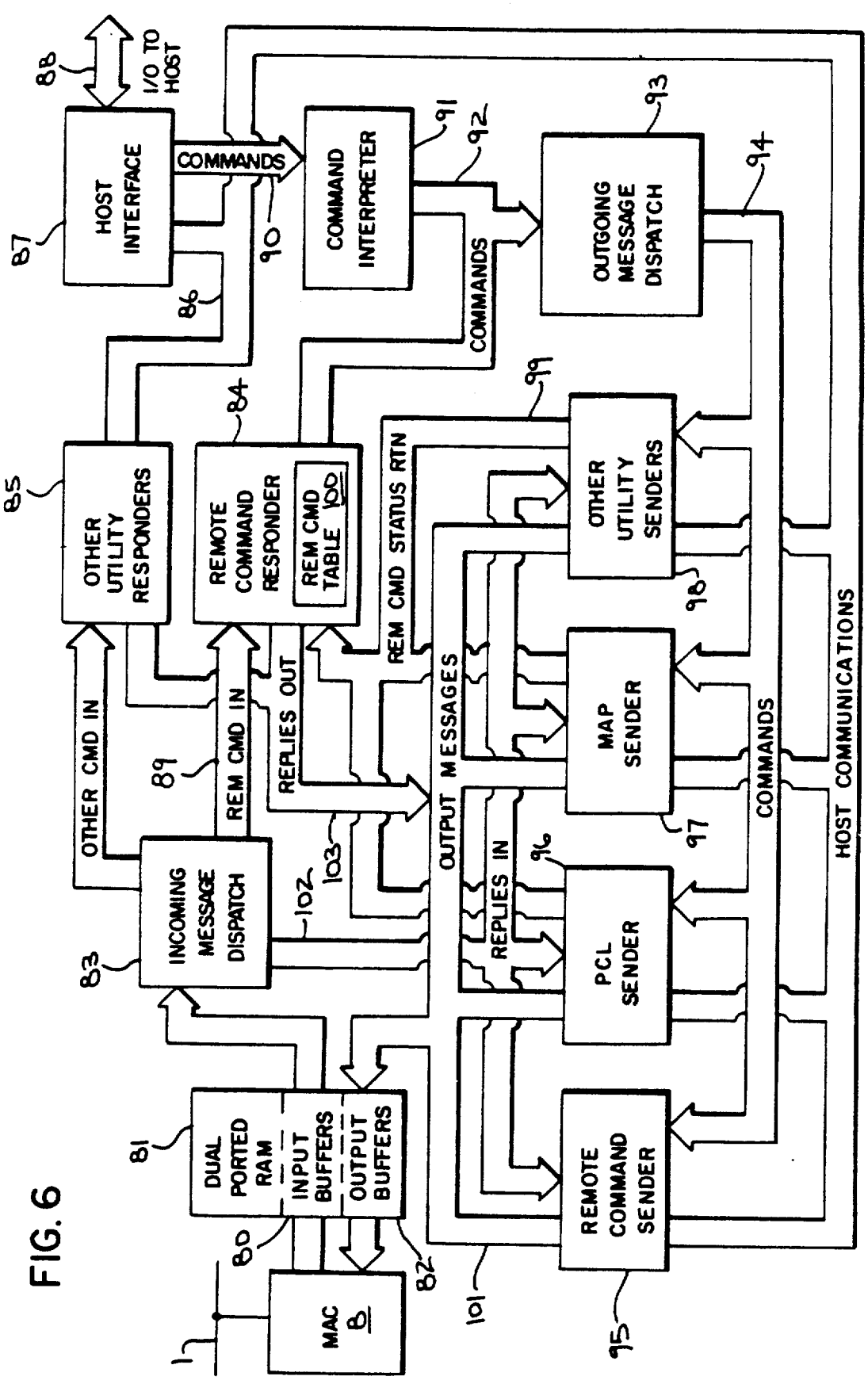
FIG. 6 is a logical block diagram of the flow of information through an interface controller which forms a part of the communications network of FIG. 1.

Referring to FIG. 6, the logical flow of messages within the interface controller 7 is as follows. Messages received from the bus 1 by the MAC 8 are placed in input buffers 80 in a dual ported RAM 81. Input messages in the input buffers 80 are routed to an incoming message dispatcher 83. The incoming message dispatcher 83 looks at the utility field 38 to determine if the input message is a command or a reply and to which utility the message is directed. If the input message is a remote command, then the message is routed to a remote command responder 84. If the input message is a command for some other utility responder, then the message is routed to the appropriate utility responder 85. The other utility responders 85 may be, for example, a PCL responder or a MAP responder which carries out received commands. Upon receipt of a command, the responder 84 or 85 carries out the command and generates a reply message containing a completion status code, and any other requested data as appropriate. The reply message is routed over a data path 103 to an output buffer 82 where it is sent out by the MAC 8.

In most cases, a received PCL or MAP command requires interaction with the host controller, for example, to read data from or write data to the host control memory or to change the operating mode of the host. A host communication data path 86 connects from the other utility responders 85 to a host interface 87. Through the data path 86, requests for host operations are processed by the host interface 87 over an I/O interface 88 to the host. The exact protocol for host operations is dependent upon, and particular to, the host connected.

The host may also initiate commands over the I/O interface 88 to the host interface 87. The host interface 87 routes commands received from the host over a data path 90 to a command interpreter 91. The command interpreter 91 formats the commands into an internal command format and provides buffering for commands awaiting further processing. The command interpreter 91 routes the commands in the internal command format over a data path 92 to an outgoing message dispatcher 93.

Still referring to FIG. 6, the remote command responder 84 receives remote commands over a data path 95. The remote commands are processed in the remote command responder 84 in a manner described below. Two of the remote commands, namely the PERFORM and EXECUTE commands, result in one or more commands being formatted into the internal command format and sent over data path 92 to the outgoing message dispatcher 93.

Figure 7:
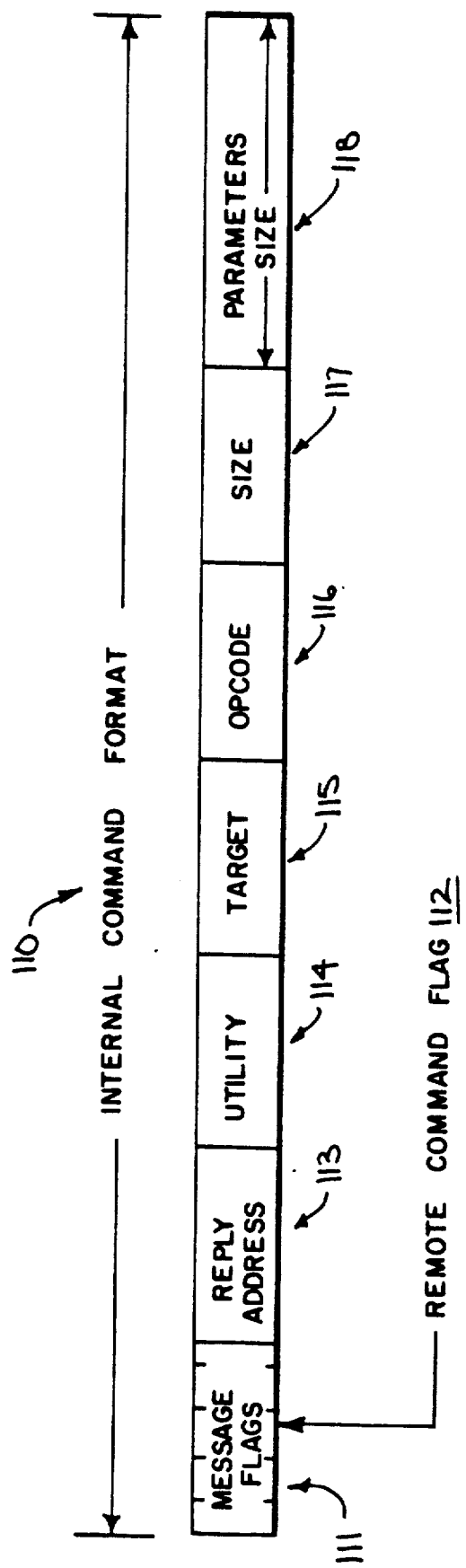
FIG. 7 is a schematic representation of the internal command format used in the information flow of FIG. 6.

Referring to FIGS. 6 and 7, the internal command format 110 accepted by the outgoing message dispatcher 93 includes the following fields. A message flag field 111 includes several single bit flags for specifying various message options. One of the message flags 111 is a remote command flag 112, which when set indicates that the command came from the remote command responder 84. If the remote command flag 112 is reset, then the command came from the host through the command interpreter 91. The purpose of the remote command flag 112 is to indicate to subsequent functions where the reply message resulting from the command is to be routed; to the remote command responder 84 or to the host. The internal message format 110 also includes a reply address 113 which is used if the command came from the host to indicate the address in the host memory where the reply is to be put when received. If the command came from the remote command responder 84, then the reply address is not used because the reply is routed directly to the remote command responder 84 and processed as described below.

Still referring to FIGS. 6 and 7, the internal message format 110 also includes a utility field 114 which indicates the utility to which the command is to be routed. The remaining fields are target 115, opcode 116, size 117, and parameters 118. These fields 115-118 are used by the sending utility to build and send out the command. The target field 115 indicates the destination, or target of the command, while the opcode field 116 specifies the particular command to be carried out by the target station. Since each different command has various parameters in differing formats, the size field 117 is used to indicate the length of the parameter field 118.

Referring again to FIG. 6, the outgoing message dispatcher 93 routes the commands in the internal command format 110 over a data path 94 to a sending utility 95-98. The sending utilities 95-98 prepare an output message in the I/O buffer format and route the message over a data path 101 to the output buffer 82. The command is then sent to the target station by the MAC 8. Upon completion of the command, the target station sends back a reply message in a reply format (not shown) which depends on the type of reply. For example, a reply to a read command would contain the requested data, and many types of error replies are possible. The reply message when received is placed in the input buffer 80 and routed by the incoming message dispatcher 83 over a data path 102 to the sending utility 95-98 which had sent out the command. A transaction number (not shown) is included in both the output message and the reply to match up the commands and responses. Each sending utility 95-98 also connects to the host interface 87 for exchanging host data requests and responses. Host data requests are used, for example, in processing read or write commands to deposit or extract data to or from the host memory respectively. The host communication data path 86 is also used to write the reply status code received upon command completion back into the host memory, if that command came from the host. If the command instead was from the remote command responder 84, then the reply status code is routed from the sending utility 96-98 back to the remote command responder 84 over a remote command status return data path 99. The remote command sender 95 does not return status to the remote command responder 84 because an outgoing remote command can only come from the host.

Hardware Description

The hardware preferred for this embodiment is that which is described in co-pending U.S. Patent application Ser. No. 771,834 filed on Sep. 3, 1985 entitled Industrialized Token Passing Network, now U.S. Pat. No. 4,667,323, and assigned to the assignee of the present invention, the contents of which are herein incorporated by reference.

Figure 8:
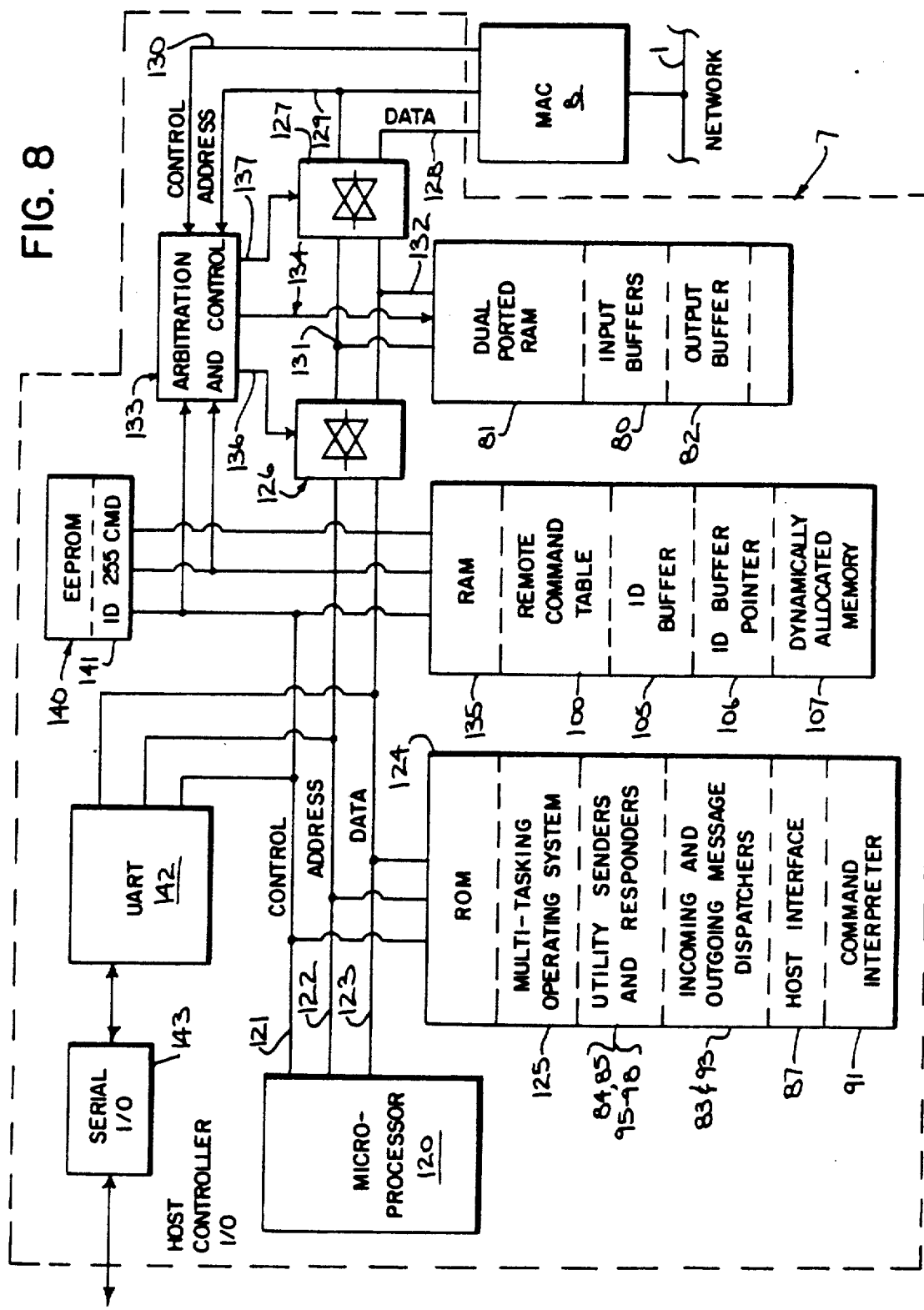
FIG. 8 is an electrical schematic diagram of an interface controller which forms a part of the communications network of FIG.. 1.

Referring to FIG. 8 the interface controller 7 is structured about a microprocessor 120 which drives a control bus 121, an address bus 122, and a bi-directional data bus 123. The microprocessor preferred for this embodiment is a model number 68000 manufactured by Motorola, Inc. A read only memory (ROM) 124 is connected to the buses 121-123, and stores the operating software for the microprocessor 120. In particular, the ROM 124 contains a multi-tasking operating system 125, which is well known in the art for coordinating system activities and managing memory resources. The utility senders 95-98 and the utility responders 84 and 85 are tasks, or software functions, which are run under the control of the multi-tasking operating system 125. Similarly the incoming and outgoing message dispatchers 83 and 93, the host interface 87, and the command interpreter 91, are all software functions which reside in the ROM 124 and which execute as tasks under the multi-tasking operating system 125 as described above in relation to FIG. 6.

Also connected to the microprocessor buses 121-123 is a random access memory (RAM) 135 which provides read/write storage for the microprocessor 120. The remote command table 100 is stored in the RAM 135 as are an ID buffer 105 and an ID buffer pointer 106, the use of which are described below. The RAM 135 also contains a block of dynamically allocated memory 107 which is allocated by the multi-tasking operating system 125 to tasks running which make requests for memory allocation as is well known in the art.

A pair of tranceivers 126 and 127 are used to connect the address bus 122 and data bus 123 from the microprocessor 120 and the corresponding data bus 128 and address bus 129 from the MAC 8 to a shared address bus 131 and shared data bus 132 connected to a dual ported RAM 81. The tranceivers 126 and 127 are controlled by signals 136 and 137 respect-fully from an arbitration and control circuit 133 to resolve contention for the shared buses 131 and 132. Contention for the dual ported RAM 81 is resolved by the arbitration and control circuit 133 in a well-known fashion by monitoring the control bus 121 and address bus 122 from the mircoprocessor 120 and the address bus 129 and a control bus 130 from the MAC 8. The dual ported RAM 81 is used to contain the input buffers 80 and the output buffers 82 for communicating messages between the interface controller 7 and the MAC 8.

An Electrically Erasable Programmable Read-Only Memory (EEPROM) 140 is also connected to the microprocessor buses 121-123, and provides nonvolatile storage for selected data. As will be explained below, the EEPROM 140 contains the stored remote command 141 which is associated with ID No. 255. By maintaining a command in the EEPROM 140 associated with a dedicated, fixed ID number, ie. ID No. 255, that command will always be available even if power is lost. It should be apparent to one skilled in the art that other types of nonvolatile RAM can be used with this invention such as, for example, battery backed up CMOS memory.

Finally, a Universal Asynchronous Receiver Transmitter (UART) 142 is connected to the microprocessor buses 121-123 and is used to provide communications to the host controller through a serial I/O circuit 143 in well-known fashion.

Software Description

Referring to FIGS. 6 and 8, the incoming and outgoing message dispatchers 83 and 93, the sender utilities 95-98, the responder utilities 84 and 85, the host interface 87, and the command interpreter 91 are all software tasks which are stored in the ROM 124 and are executed under the control of the multi-tasking operating system 125 by the microprocessor 20. As is well known in the art, the multi-tasking operating system manages the execution of tasks running under it by providing a facility for tasks to be started, terminated, or suspended while awaiting some predetermined event and by providing a facility for tasks to communicate data among one another. This communication facility is represented by the various data paths of FIG. 6.

The capability of this invention for saving and performing remote commands is implemented in the remote command responder 84. The remote command responder 84 is a software task which is activated by the multi-tasking operating system 125 in response to an indication from the incoming message dispatch task that a remote command has been received.

Figure 9:
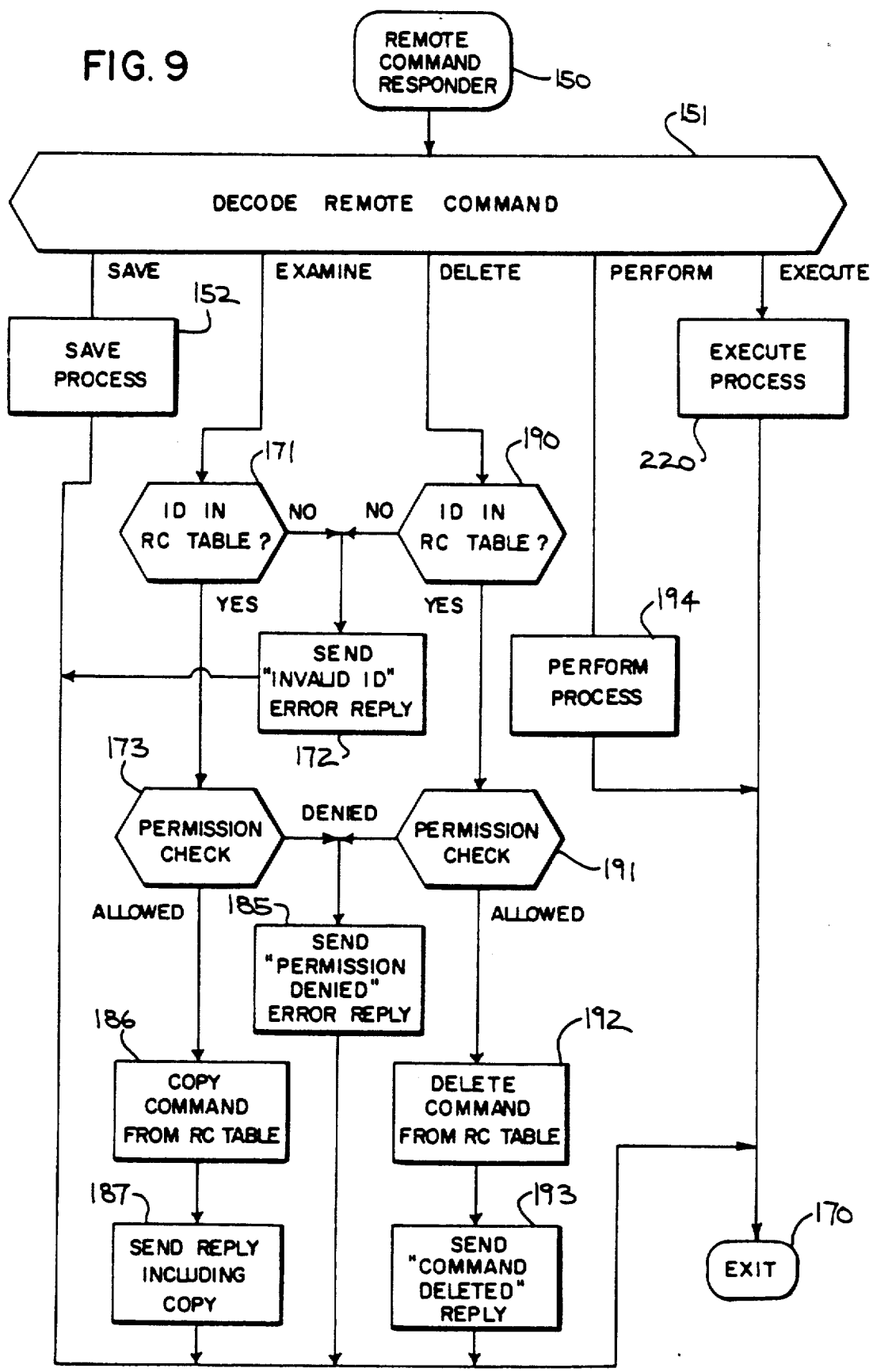
FIG. 9 is a flow chart of the remote command responder program executed by the interface controller of FIG. 8.

Referring to FIG. 9, the remote command responder 84 is entered at block 150, and proceeds directly to decision block 151 to decode the remote command just received. If the remote command is a SAVE command then control transfers to process block 152, where the SAVE command is processed.

Figure 10:
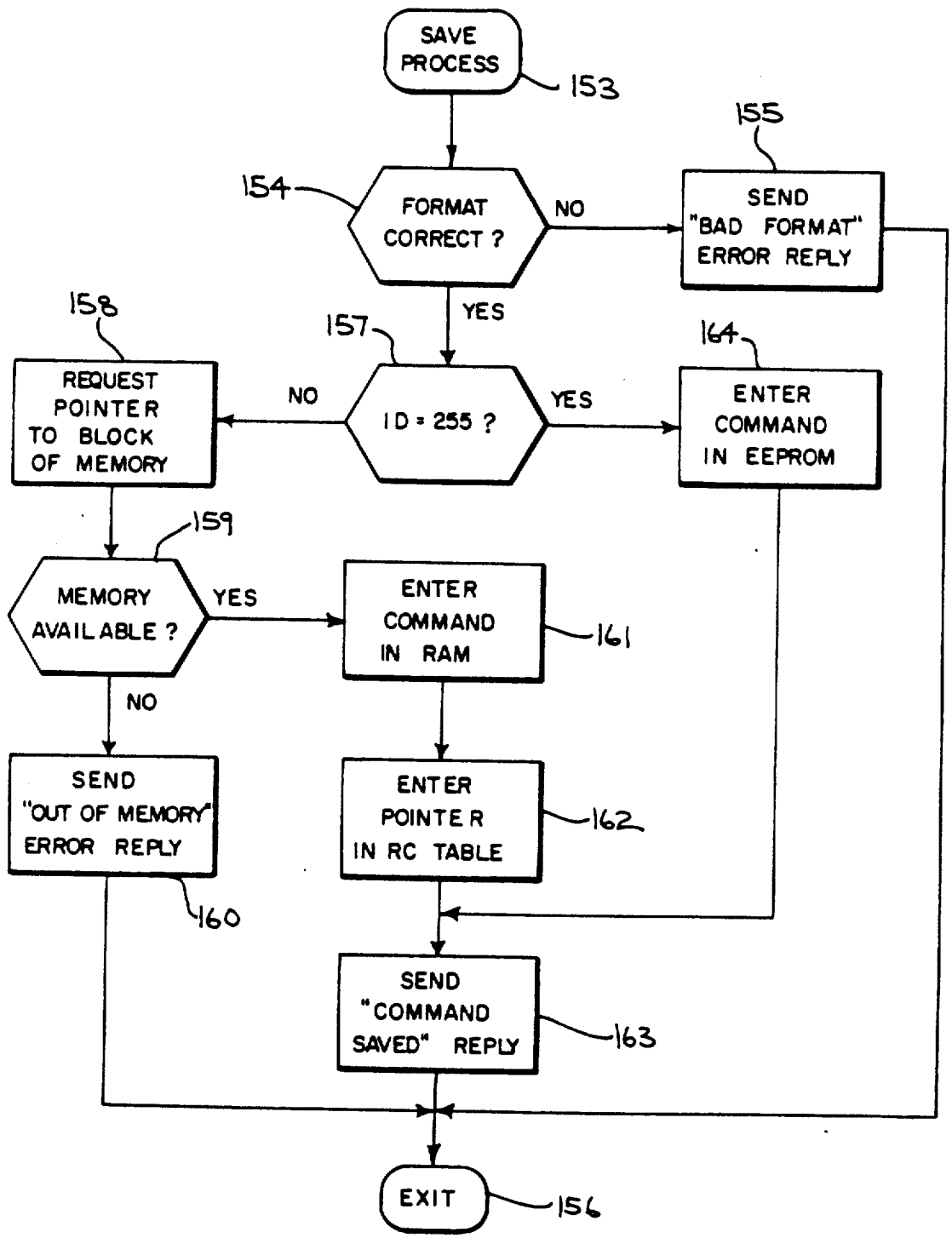
FIG. 10 is a flow chart of the program for processing SAVE type remote commands which forms a part of the program of FIG. 9.

Referring to FIG. 10 the save process is entered at block 153. At block 154 the format of the SAVE command is checked, including the format of the embedded command. If the format of the SAVE command is not correct, then control transfers to block 155 and a "bad format" error reply is sent back to the station which originated the remote command. After sending the error reply at block 155, the save process is exited at block 156.

At block 154, if the format of the remote command is correct, control transfers to block 157, where a test is made to see if the ID field in the remote command is equal to 255. An ID of 255 has special significance because the remote command associated with ID No. 255 is stored in the nonvolatile EEPROM 140 to insure that it is always available. If the ID is not equal to 255, then the command will be saved in RAM 135, and control transfers to block 158.

Figure 11:
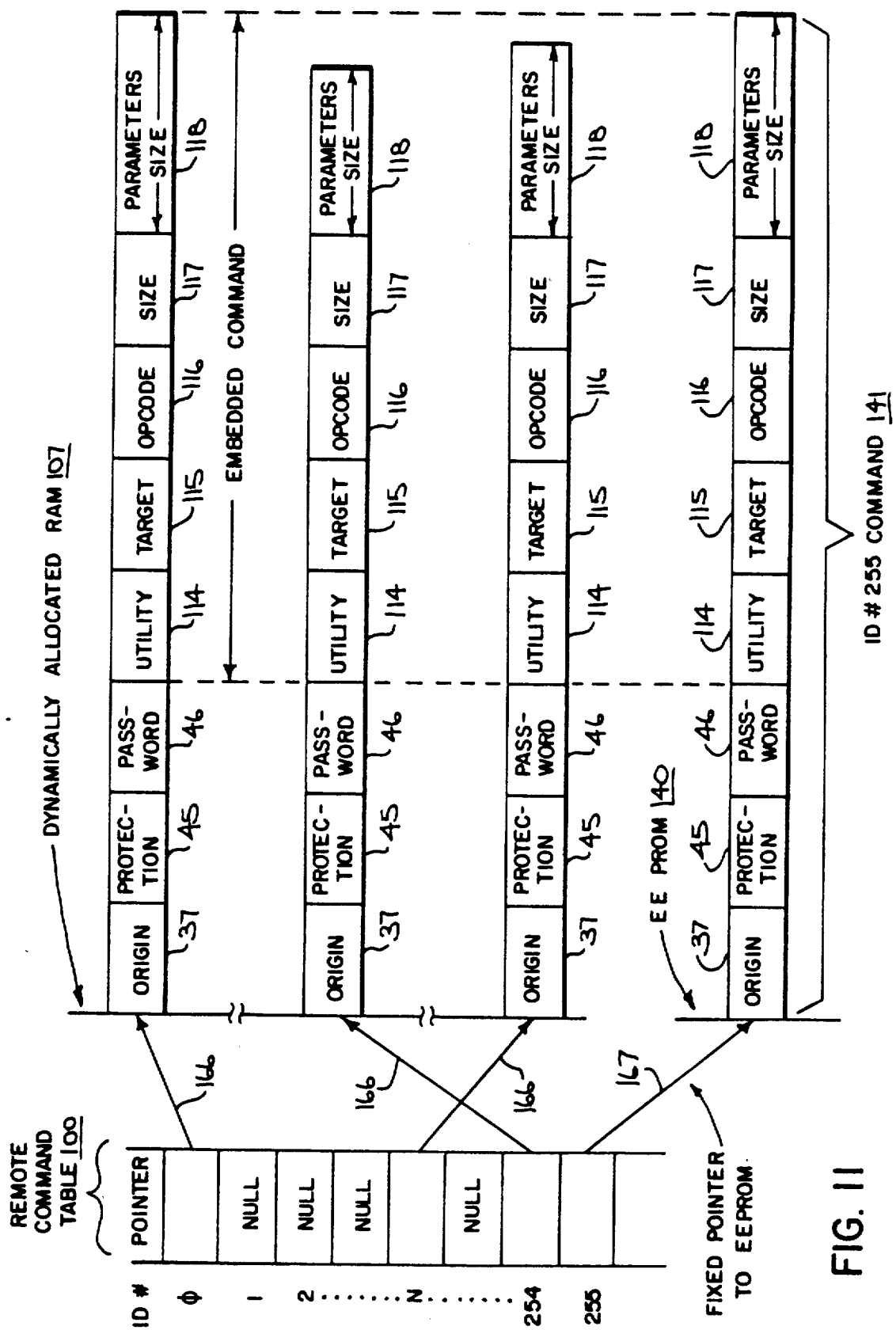
FIG. 11 is a schematic representation of the structure of the remote command table which is stored in a memory that forms a part of the interface controller of FIG. 8.

Referring to FIGS. 10 and 11, the remote command table 100 is a list of pointers numbered consecutively from 0 to 255, with each pointer being associated with the corresponding ID number 0 to 255. Pointers which do not have a command saved under the associated ID number have a null entry for the pointer, indicating that there is no command saved for that ID number. ID numbers 0 through 254 which have a command saved contain a pointer 166 which points to an area of dynamically allocated RAM 107 which contains the saved command. Each saved command includes fields for the origin 37, protection 45, password 46, and the embedded command. The embedded command in turn includes fields for the utility 114, target 115, opcode 116, size 117, and a variable length parameter field 118 the length of which is indicated by the size parameter 117. Because the length of each saved command can very significantly due to the variable length parameter field 118, the dynamically allocated RAM 107 is used to preclude the necessity of dedicating a very large fixed block of memory to store all possible saved commands. At process block 158, when it is necessary to save a new command, a request is made to the multitasking operating system 125 to assign a block of dynamically allocated memory 107 of the appropriate size needed to store the saved command. At decision block 159, the multi-tasking operating system 125 checks the amount of dynamically allocated RAM 107 remaining to see if there is enough memory available to grant the memory request. If there is not enough memory available, the multi-tasking operating system 125 returns an error code and processing branches to block 160 where an "out of memory" error reply is sent back to the station which originated the remote command. The error reply at block 160 indicates that the embedded command could not be saved because of a lack of available memory. After sending the error reply at block 160, the save process exits at block 156.

Back at decision block 159, if sufficient memory was available the multi-tasking operating system 125 allocates the requested block of memory and returns a pointer indicating the address of the block of memory, and control transfers to block 161. At block 161 the command is saved by filling in the fields for the origin 37, protection 45, password 46, and the embedded command in the block of memory just allocated from the information in the input buffer 80. Then at process block 162 the pointer to the block of memory containing the saved command is entered in the remote command table 100 at the location corresponding to the ID number indicated in the remote command. If a new command is saved in the remote command table under the same ID as an existing old command, the old command is discarded by overwriting the pointer to the old command with the pointer to the new command and returning the dynamically allocated RAM 107 used for the old command to the multi-tasking operating system 125. Control then transfers to block 163 where a "command saved" reply message is sent back to be station which originated the remote command.

Still referring to FIGS. 10 and 11, at decision block 157 if the ID field in the remote command is equal to 255, then control transfers to block 164 where the command is entered into the EEPROM 140. The remote command table 100 contains a fixed pointer 167 at the location corresponding to ID number 255 which points to a fixed, dedicated area of EEPROM 141 for containing the command associated with ID 255. The dedicated area of EEPROM 141 is large enough to contain the longest possible saved command. The fixed pointer 167 is set up during system initialization and remains constant, so that no changes need to be made in the remote command table 100 to save the command in the EEPROM 140. To save the command, the dedicated area 141 is pro-grammed, or "burned", in well-known fashion with the same fields as in the dynamically allocated RAM 107, including the origin 37, protection 45, password 46, and the embedded command. Since there is always an old command in the EEPROM 140 because it is nonvolatile, the new command is overwritten over the old command. The new command then stays in the EEPROM 140 indefinitely, until it too is overwritten by a subsequent command. After so entering the command in the EEPROM 140 at block 164, control transfers to block 163 where the "command saved" reply is sent to the station which originated the remote command. The save process then exits as before at block 156.

Referring again to FIG. 9, upon completion of the save process at block 152 as described above, the remote command responder 84 is exited at block 170. Back at decision block 151, if the remote command is an EXAMINE command, then control transfers to decision block 171. At decision block 171 the remote command table 100 is tested to see if a command is saved under the ID indicated in the EXAMINE command. If a command is not saved at the indicated ID, control transfers to block 172 and an "invalid ID" error reply is sent back to the station which originated the EXAMINE command. After sending the error reply at block 172 the remote command responder 84 exits at block 170. At decision block 171, if a command exists in the remote command table 100 at the indicated ID, then control transfers to decision block 173, where a check is made to see if the station which originated the EXAMINE command is allowed permission to access the saved command.

Figure 12:
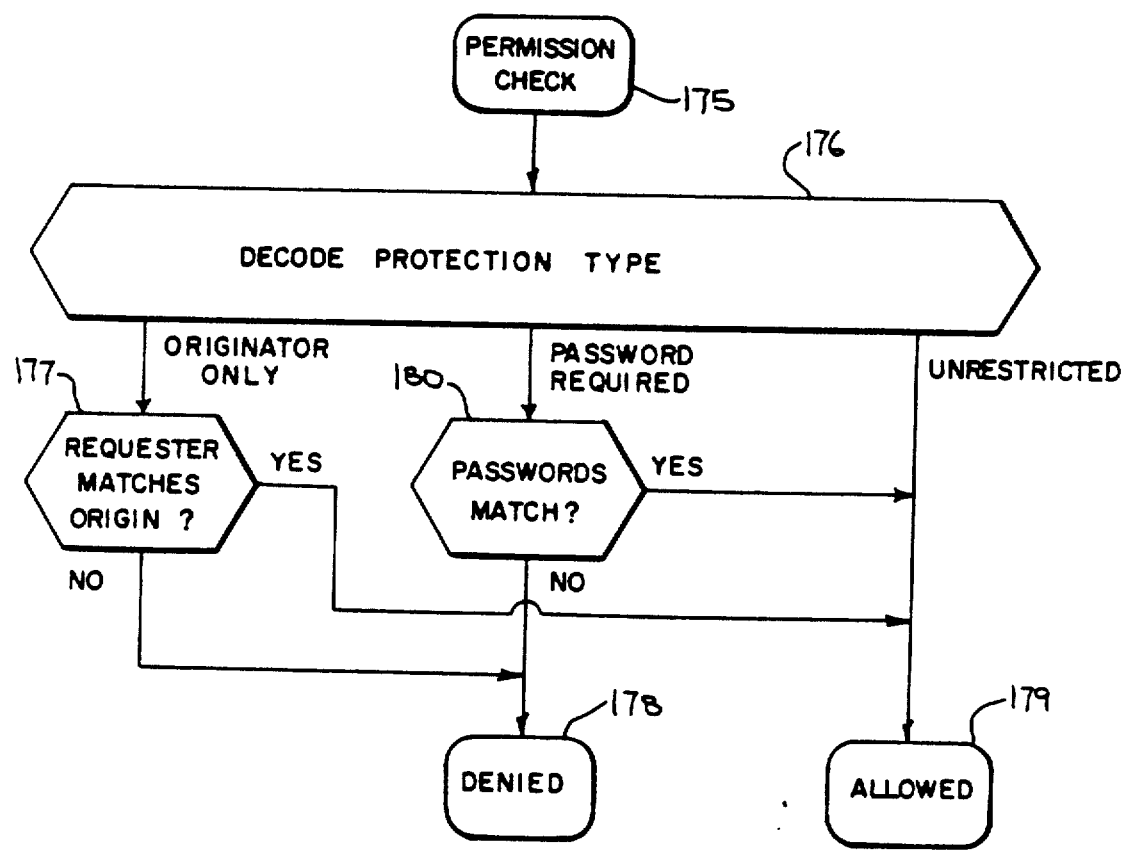
FIG. 12 is a flow chart of the program for performing a permission check which forms a part of the program of FIG. 9 and FIG. 13.

Referring to FIGS. 9 and 12, the permission check is entered at block 175 and proceeds to decision block 176 where the protection field 45 of the saved command is checked to determine what type of protection applies. If the protection type indicated by the protection field 45 specifies access for the originator of the saved command only, then control transfers to decision block 177. Originator only protection means that only the station which initially saved the remote command is allowed access to it, where the identity of the station which saved the command is indicated by the origin field 37. At decision block 177 the origin field 37 is compared with the identity of the station which sent the current command requesting access to the saved command. If the requester for access to the saved command does not match the origin field 37, then permission is denied and the permission check exits at block 178. On the other hand, if at decision block 177 the identity of the requester does match the origin field 37 then permission is allowed and the permission check exits at block 179. If at decision block 176, the protection type specified requires a password, then control transfers to decision block 180, where the password specified in the current command which is requesting access is compared to the password field 46 of the saved command. If the passwords do not match, then permission is denied and the permission check exits at block 178. However, if the passwords match then permission is allowed and the permission check exits at block 179. If at decision block 176 the protection type specified is unrestricted then permission is always allowed and the permission check exits at block 179.

Referring again to FIG. 9 if the permission check at block 173 results in permission being denied, then control transfers to block 185 where a "permission denied" error reply is sent back to the station which sent the EXAMINE command, and then the remote command responder 84 exits at block 170. If, however, at decision block 173 permission is allowed, the processing proceeds to block 186 where a copy is made of the embedded command saved in the remote command table 100 at the ID indicated in the EXAMINE command. Then at block 187, the copy of the requested embedded command is formatted into a reply message and sent back to the station from which the EXAMINE command was received. After sending the reply message at block 187 the remote command responder 84 exits at 170.

Still referring to FIG. 9, at decision block 151 if the remote command is a DELETE command, then control transfers to decision block 190. At decision block 190 the remote command table 100 is checked to see if a command is saved under the ID specified in the DELETE command. If there is no command saved for the specific ID, then control branches to block 172 where the "invalid ID" error reply is sent back to the station which originated the DELETE command, and the remote command responder 84 exits at 170. At decision block 190, if a command does exist in the remote control table 100 for the ID specified in the DELETE command, then control transfers to decision block 191 where the permission check described above is performed. If permission is denied control transfers to block 185 where the "permission denied" error reply is sent back to the station which originated the DELETE command, and the remote command responder 84 exits at 170. If at decision block 191 permission is allowed then control transfers to block 192. At block 192, the saved command is deleted from the remote command table 100 by entering a null in the remote command table 100 at the location corresponding to the ID specified in the DELETE command, and returning the block of dynamically allocated RAM 107 back to the multi-tasking operating system 125. Then at block 193, a "command deleted" reply is sent back to the station which originated the DELETE command, and the remote command responder 84 exits at 170.

Figure 13:
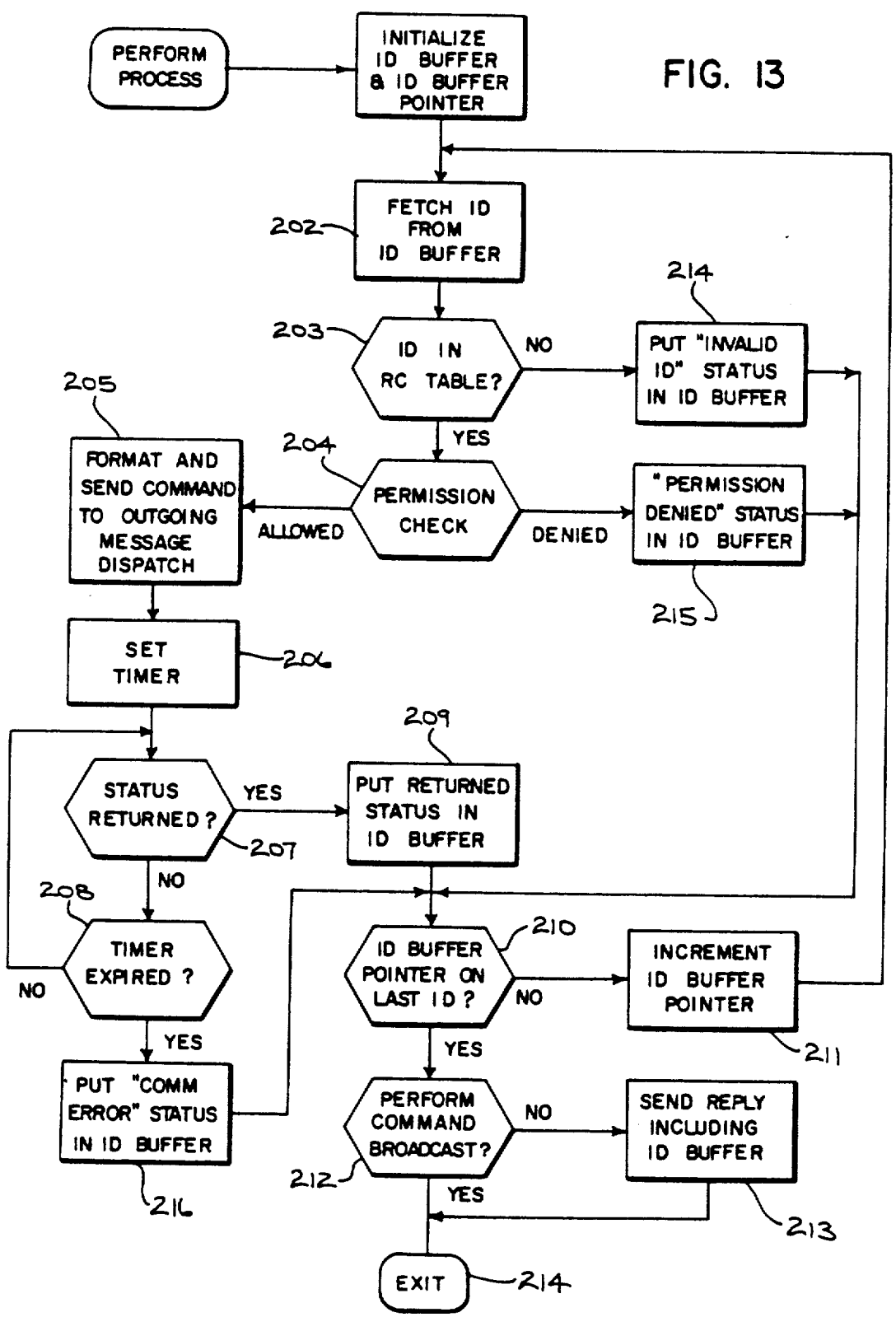
FIG. 13 is a flow chart of the program for processing PERFORM type remote commands which forms a part of the program of FIG. 9.

Referring to FIGS. 9 and 13, if at decision block 151 the remote command is a PERFORM command, then control transfers to the perform process 194. The perform process 194 is entered at 200 and proceeds to block 201 where the ID buffer 105 and ID buffer pointer 106 are initialized.

Figure 14:
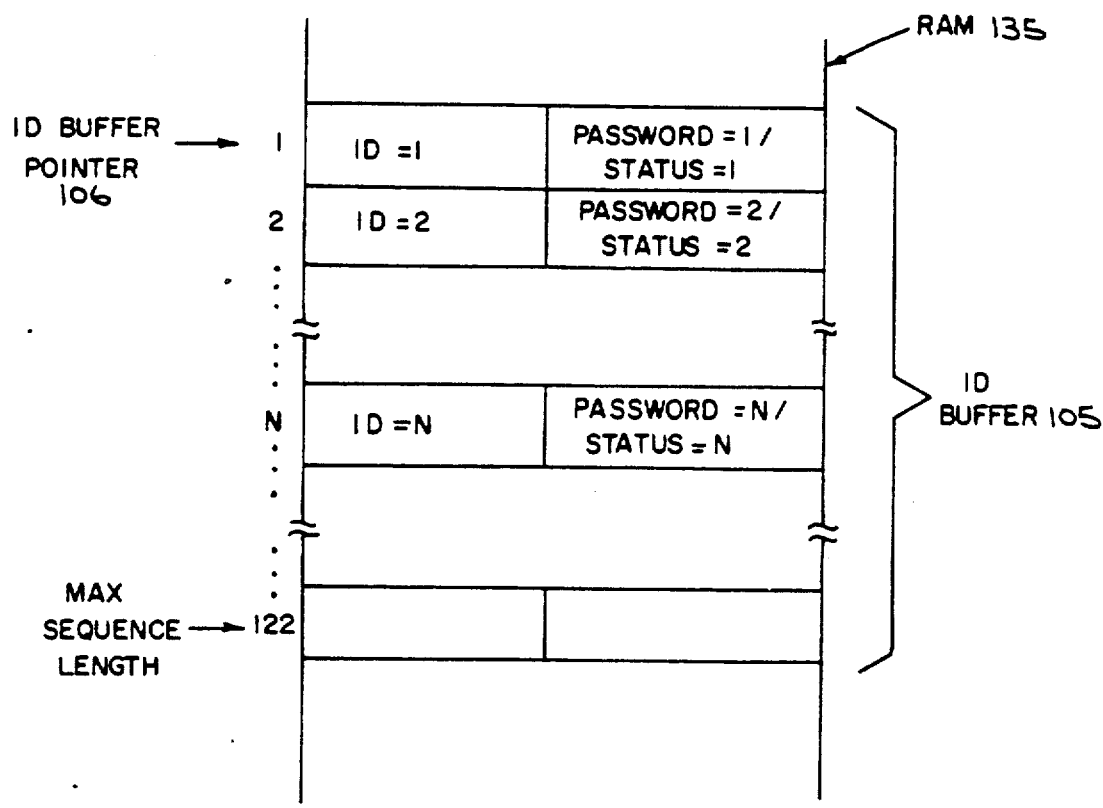
FIG. 14 is a map of the ID buffer area which is stored in a memory that forms part of the interface controller of FIG. 8.

Referring to FIG. 14, the ID buffer 105 is contained in the RAM 135 and is used to store the sequence of ID numbers specified in the PERFORM command. The ID buffer 105 is initialized by copying the ID numbers and their associated passwords from the PERFORM command into the ID buffer 105. The ID buffer pointer 106 is initialized to point to the first entry in the ID buffer 105 which will be the first command to be performed. The remaining commands will be performed in sequence up until command number N, where N is the number of commands specified in the PERFORM command. The ID buffer 105 is long enough to accommodate 122 ID/Password pairs, which is the maximum command sequence length that can be specified. As will be explained below the ID buffer 105 initially stores ID/Password pairs. The password field is also used to contain the status code which is returned from the target station after the saved command is sent. The returned status code is overwritten over the password field. After completion of all the saved commands, the ID buffer 105 then contains ID/Status pairs which indicates the returned status codes corresponding to each ID which is then returned to the station which originated the PERFORM command.

Referring to FIGS. 13 and 14, after initializing the ID buffer 105 and ID buffer pointer 106 at block 201, processing continues at block 202 where the ID number pointed to by the ID buffer pointer 106 is extracted from the ID buffer 105. The ID so extracted becomes the current ID which is acted upon by the processes following. At decision block 203 the remote command table 100 is checked to see if a command is saved under the current ID. If a command is stored under the current ID, then control passes to decision block 204 where the permission check described above is performed. The permission check is performed using the password from the ID buffer 105 at the location pointed to by the ID buffer pointer 106 to supply the password if password type protection is specified by the saved command. If permission is allowed for this saved command, then control transfers to block 205. At block 205 a command is formatted into the internal command format 110 using the fields from the saved command. The remote command flag 112 in the internal command format 110 is set to indicate that this command came from the remote command responder 84 as described above. The command so formatted is then sent to the outgoing message dispatcher 93 where it is then routed to the appropriate sending utility 96-98 as specified by the utility field 114. The sending utility may be the PCL sender 96, map sender 97, or other utility sender 98. The command is then sent out to the target station by the sending utility 96-98 in the manner described above. The target station will then subsequently send back a reply message.

Referring again to FIG. 13 after sending out the command at block 205, processing continues at block 206 where a timer is set to a time limit sufficient to allow the target station to send the reply. Then at decision blocks 207 and 208, a wait state is entered waiting for the status reply message to be returned from the target station. If a status reply message is returned at decision block 207 before the timer expires, then control transfers to block 209 where the returned status is written over the password field in the ID buffer 105 a the location pointed to by the ID buffer pointer 106. From block 209, control transfers to decision block 210, where the ID buffer pointer 106 is tested to see if it is pointing to the N$^{th}$ entry in the ID buffer 105. If the ID buffer pointer 106 is not pointing to the N$^{th}$ entry, then there are more commands in the perform sequence waiting to be sent out, and control transfers to block 211. At block 211 the ID buffer pointer 106 is incremented to point to the next sequential entry in the ID buffer 105 and then a branch is taken back to block 202 to send out the next sequential saved command. If, however, at decision block 210 the ID buffer pointer 106 is pointing to the N$^{th}$ entry, then this perform sequence has been completed, and control transfers to decision block 212.

At decision block 212, the destination field 38 is tested to determine if the PERFORM command was received as a broadcast or was addressed specifically to this station. If the destination field 38 is equal to "255", then this PERFORM command was received as a broadcast. Reply messages are not generated in response to broadcast messages because of the inherent uncertainty over which stations respond to the broadcast. And so, if the PERFORM command was broadcast, the perform process is complete and the exit at block 214 is taken. On the other hand, if the PERFORM command was addressed specifically to this station, then control transfers to block 213. At block 213 a reply message is sent back to the station which originated the PERFORM command. The reply message includes the contents of the ID buffer 105 which indicates to the station which originated the PERFORM command the ID/Status pair for each saved command sent out in the perform sequence. After sending the reply message at block 213 the perform process exits at block 214.

Still referring to FIG. 13, several possible errors can occur in processing each individual saved command corresponding to a specific ID in a perform sequence. When such errors occur, a corresponding error code is placed in the password/status field in the ID buffer 105 instead of a returned status reply. For example, at decision block 203 if an ID specified in a command sequence is not found in the remote command table 100 then control passes to block 214 where an "invalid ID" status code is placed in the password/status field in the ID buffer 105 at the location pointed to by the ID buffer pointer 106. From block 214 control passes to decision block 210 for processing of subsequent commands in the perform sequence as described above. If at decision block 204 the permission check is denied, then processing transfers to block 215 where a "permission denied" status code is placed in ID buffer 105, and then a branch is taken to decision block 210 to process further commands. Finally, at decision block 208 if the timer should expire before receiving a status reply message from the target station, then control transfers to block 216 where a "communications error" status code is placed in the ID buffer 105 at the location pointed to by the ID buffer pointer 106, and control then passes to decision block 210 to process further commands in the perform sequence. The error codes thus written into the ID buffer 105 affect only the saved commands for which the errors occurred. Other commands in the perform sequence are not affected, and the station which originated the PERFORM command is notified of the errors by virtue of the error codes in the reply message to the PERFORM command.

Referring again to FIG. 9, upon completing the perform process at block 194 the remote command responder 84 exits at block 170. Back again at decision block 151, if the remote command is an EXECUTE command, then control passes to the execute process at block 220.

Figure 15:
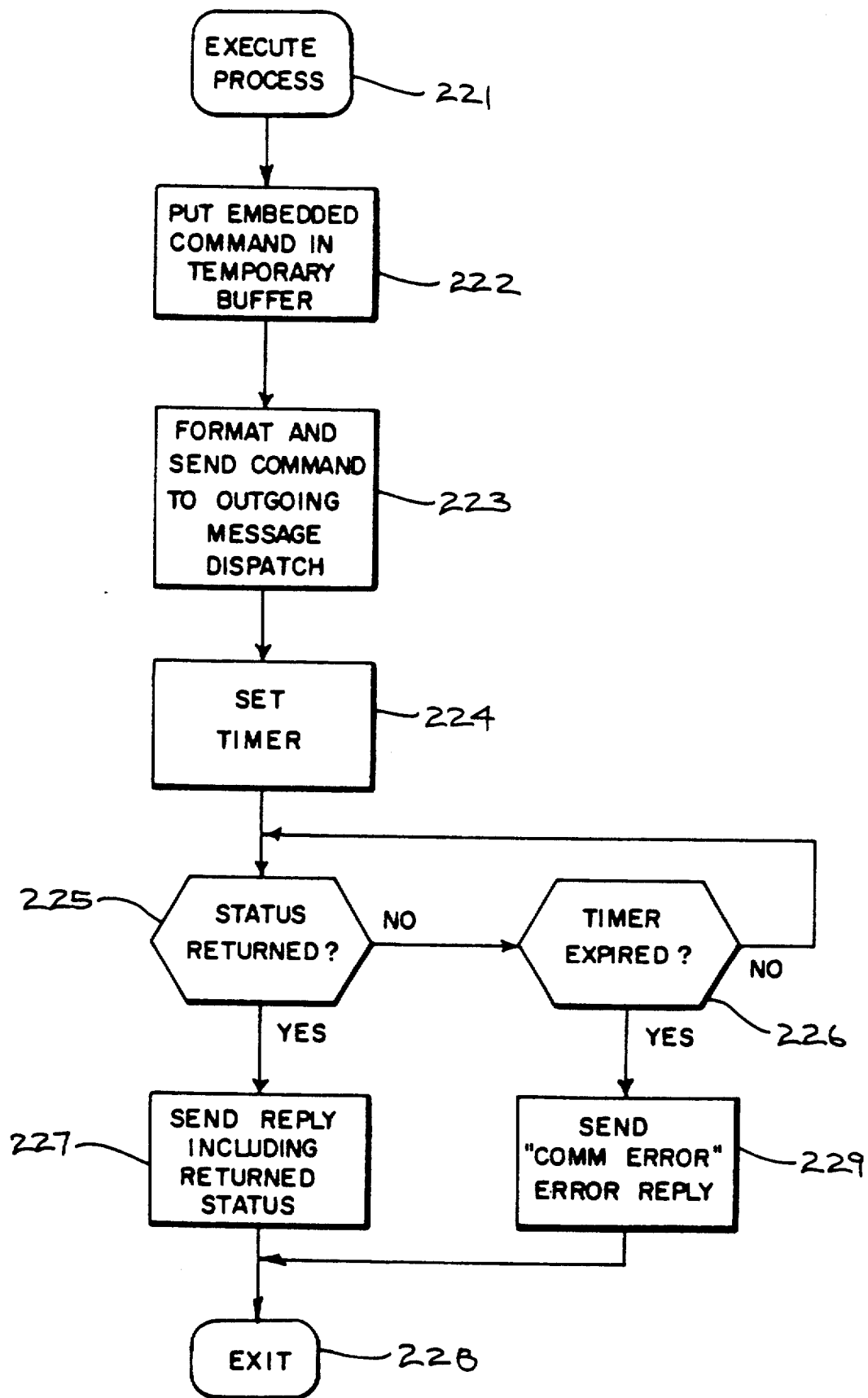
FIG. 15 is a flow chart of the program for processing EXECUTE type remote commands which forms part of the program of FIG. 9.

Referring to FIG. 15, the execute process is entered at block 221 and processing continues at block 222 where the embedded command from the EXECUTE command is saved in a temporary buffer (not shown). Then at block 223 the embedded command is formatted into the internal command format 110 and sent to the outgoing message dispatcher 93 and sent out to the target station as described above. As with the perform process described above, a timer is set at block 224 and a wait loop consisting of blocks 225 and 226 is entered to await return of a status reply message from the target station.

If a status reply message is returned from the target station at decision block 225, control transfers to block 227 where a reply to the EXECUTE command is returned to the station which originated the EXECUTE command. The reply to the EXECUTE command includes the status code returned from the target station in response to the embedded command. After sending the reply at block 227 the execute process exits at block 228. If at decision block 226 the timer expires before a status reply message is received from the target station, then control transfers to block 229 where a "communications error" error reply is returned to the station which originated the EXECUTE command, and the execute process exits at block 228. The execute process is thus a convenient mechanism for utilizing the remote command responder 84 to send out a single third party command without the necessity of formally saving, performing, and deleting the command.

Referring again to FIG. 9 upon completion of the execute process of block 220 the remote command responder 84 exits at block 170.

Referring to FIGS. 5 and 6, when the host controller desires to originate a remote command, the command is sent to the host interface 87 over the I/O path 88. From the host interface 87 the remote command is forwarded to the command interpreter 91, which formats the remote command into the internal command format 110. The information fields 113–118 of the internal command format are supplied by the host in the remote command. The reply address field 113 specifies the address in the memory of the host controller where the reply message to this remote command is to be placed. The utility field 114, in this case, contains a code which designates the remote command sender utility 95. The target field 115 contains the destination address of the station on the network which is to receive this remote command. The opcode field 116 specifies which remote command is being sent, e.g. SAVE, PERFORM, EXAMINE, DELETE, or EXECUTE, while the size 117 and parameter 118 fields are used to specify the additional parameters which are required for each of the remote commands as defined by the utility data fields 41 of FIG. 5. The remote command then proceeds from the command interpreter 91 over data path 92 to the outgoing message dispatcher 93, and finally to the remote command sender 95 over data path 94. The remote command sender 95 then reformats the remote command from the internal command format 110 to the I/O buffer format of FIG. 5. The origin field 37 is filled in automatically by the MAC 8. The destination field 38 is filled in with the address of the target station 115 from the internal command format 110. A target address of 255 is used to indicate that a PERFORM command is to be broadcast to all other stations on the network. Remote commands other than PERFORM commands are not allowed to be broadcast and result in an error code being returned by the remote command sender 95 to the host if attempted. The utility field 39 is filled in to indicate that this remote command is to be routed to a remote command responder utility 84 at the destination station. The command field 40 is filled in according to the opcode field 116 of the internal command format 110 to indicate the type of remote command being sent, and the utility data field 41 is filled in with the parameters 118 corresponding to the remote command specified in the command field 40 as described above. Once the remote command has been formatted into the output buffer format, the remote command sender 95 places the remote command in the output buffer 82 via the output message data path 101 and the MAC 8 sends the remote command out. When the reply to the remote command is received from the remote command responder 84 as described above, the remote command sender 95 places the reply back in the host memory at the reply address 113 via the host communications data path 86.

We claim:

1. A method for operating a first network station connected to a communication network interconnecting a plurality of other network stations, with each of said other network stations implementing a predetermined set of command messages, the method comprising the steps of:
    (a) formatting an embedded command comprising one command message from said predetermined set of command messages, the embedded command including a first destination field which indicates the address of a target network station and is assigned as if the embedded command were to be sent from a second network station to the target network station;
    (b) formatting a first remote command message by including in the first remote command message (i) a second destination field which indicates the address of the second network station, (ii) a first field containing a code identifying the first remote command message as a SAVE type remote command message, (iii) the embedded command, and (iv) a second field which includes a first ID specifying an identity under which the embedded command is to be stored in a remote command table in the second network station; and
    (c) transmitting the first remote command message to the second network station.

2. The method as recited in claim 1 which further includes the steps of:
    (d) formatting a second remote command message by including the second remote command message (i) a second destination field which indicates the address of the second network station, (ii) a first field containing a code identifying the second remote command message as an EXAMINE type remote command message, and (iii) a second field which includes the first ID specifying the identity under which the embedded command had previously been stored in the remote command table in the second network station, thereby instructing the second network station upon receipt of the EXAMINE type remote command message to recall the embedded command specified by the first ID from the remote command table and to transmit a reply message from the second network station back to the first network station, the reply message including a data field which contains the recalled embedded command; and
    (e) transmitting the second remote command message to the second network station.

3. The method as recited in claim 1 which further includes the steps of:
    (d) formatting a second remote command message by including in the second remote command message (i) a second destination field which indicates the address of the second network station, (ii) a first field containing a cod identifying the second remote command message as a DELETE type remote command message, and (iii) a second field which includes the first specifying the identity under which the embedded command has previously been stored in the remote command table in the second network station, thereby instructing the second network station upon receipt of the DELETE type remote command message to delete the embedded command specified by the first ID from the remote command table in the second network station; and
    (e) transmitting the second remote command message to the second network station.

4. The method as recited in claim 1 which further includes the steps of:
    (d) formatting a second remote command message by including in the second remote command message (i) a second destination field which indicates the address of the second network station, (ii) a first field containing a code identifying the second remote command message as a PERFORM type remote command message, and (iii) a second field which includes the first ID specifying the identity under which the embedded command had previously been stored in the remote command table in the second network station, thereby instructing the second network station upon receipt of the PERFORM type remote command message to recall the embedded command specified by the first ID from the remote command table and to transmit the recalled embedded command from the second network station to the target network station; and
    (e) transmitting the second remote command message to the second network station.

5. The method as recited in claim 4 in which steps (a)-(c) are repeated to transmit a plurality of SAVE type remote command messages to store an embedded command at each of at least two different network stations, and in which the PERFORM type remote command message is formatted in step (d) and transmitted in step (e) as a single broadcast message sent simultaneously to said at least two different network stations.

* * * * *

UNITED STATES PATENT AND TRADEMARK OFFICE
CERTIFICATE OF CORRECTION

PATENT NO. : 5,113,502
DATED : May 12, 1992
INVENTOR(S) : Ricahrd A. Merrill, et al It is certified that error appears in the above-indentified patent and that said Letters Patent is hereby corrected as shown below:

Column 20, line 21, "cod" should be -- code --.
Column 20, line 24, "first specifying" should be -- first ID specifying --.

Signed and Sealed this

Twenty-fourth Day of August, 1993

Attest:

BRUCE LEHMAN

*Attesting Officer*     *Commissioner of Patents and Trademarks*